United States Patent [19]
Chakrabarti et al.

[11] Patent Number: 5,109,037
[45] Date of Patent: Apr. 28, 1992

[54] SURFACE-MOLDIFIED AMMONIUM POLYPHOSPHATE

[75] Inventors: Paritosh M. Chakrabarti, Pittsburgh; Kenneth J. Sienkowski, Bethlehem, both of Pa.

[73] Assignee: PPG Industries, Inc., Pittsburgh, Pa.

[21] Appl. No.: 538,804

[22] Filed: Jun. 15, 1990

[51] Int. Cl.$^5$ .............................. C08K 3/28; C08K 9/04
[52] U.S. Cl. ..................................... 523/202; 523/179;
523/205; 524/416; 428/407
[58] Field of Search ....................... 523/179, 202, 205;
428/407; 524/416

[56] References Cited

U.S. PATENT DOCUMENTS

| | | | |
|---|---|---|---|
| 3,926,990 | 12/1975 | Fukuba et al. | 260/249.6 |
| 3,936,416 | 2/1976 | Brady | 260/42.18 |
| 4,038,237 | 7/1977 | Snyder | 524/423 |
| 4,193,945 | 3/1988 | Bertelli et al. | 525/2 |
| 4,306,878 | 12/1981 | Brown et al. | 23/230 |
| 4,616,049 | 10/1986 | Thompson et al. | 523/212 |
| 4,618,633 | 10/1986 | Taubitz et al. | 524/80 |
| 4,632,946 | 12/1986 | Muench et al. | 523/179 |
| 4,694,030 | 9/1987 | von Bonin et al. | 523/179 |

FOREIGN PATENT DOCUMENTS 661812  4/1963  Canada ................................. 523/179

OTHER PUBLICATIONS

GAF Products for Cosmetics Reference Guide.

Primary Examiner—Paul R. Michl
Assistant Examiner—John J. Guarriello
Attorney, Agent, or Firm—George D. Morris

[57] ABSTRACT

The water leaching of ammonium polyphosphate from compositions comprising organic polymer and particles of ammonium polyphosphate is reduced if the ammonium polyphosphate is surface-modified with copolymer of vinylpyrrolidone and comonomer selected from the group consisting of α-olefin containing from about 4 to about 50 carbon atoms, styrene, styrene substituted on the ring with at least one alkyl group containing from 1 to about 12 carbon atoms, and mixtures thereof.

28 Claims, No Drawings

SURFACE-MOLDIFIED AMMONIUM POLYPHOSPHATE

The use of polyolefins for insulating electrically conducting wiring is known. Generally the polyolefin is extruded around the wire during manufacture. The polyolefin insulation is a good electrical insulator and, when used alone, is substantially waterproof. The main disadvantage of polyolefin insulation is its flammability. Once ignited, the burning polyolefin produces both copious amounts of smoke and drops of burning liquid polyolefin which drip and tend to spread the fire. Polyolefin insulated wires and cables and bundles of these are therefore substantial firehazards. It is commonplace in buildings and ships to have bundles of insulated electrical wires and cables passing through openings in walls or bulkheads to expedite the delivery of electrical power from room to room. In time of fire these openings can be instrumental in spreading the fire and smoke from room to room.

Various fire retardants have been admixed with the polyolefin in order to provide fire retardancy to the composition. These have been only partially successful, however, because most fire retardants are not very compatible with polyolefins or because they are prohibitively expensive for commercial applications.

One approach that has been followed is the incorporation materials which impart intumescence to the polyolefin-based insulation composition. Such intumescent compositions form adherent chars which swell up and impede further burning of the underlying composition. One class of intumescent compositions used for electrical wiring insulation comprises polyolefin, ammonium polyphosphate, and at least one carbonific or spumific. Carbonifics are nonresinous materials which produce large volumes of both nonflammable gas and carbon in the presence of phosphoric acid. Carbonific materials are generally carbohydrates or polyfunctional alcohols such as pentaerythritol. Spumifics are materials which release large quantities of gas under the influence of phosphoric acid produced at elevated temperatures. Spumifics are often resinous in nature and often act as binders in addition to forming gas. Spumific materials are most often amides or amines such as urea, guanidine, or dicyandiamide, which liberate gaseous pyrolysis products.

Ammonium polyphosphate, often abbreviated "APP", is particularly useful because it has a high phosphorous content and because it yields phosphoric acid at temperatures below the decomposition temperatures of the carbonifics and spumifics and yet above the normal temperatures used for processing the intumescent composition.

Notwithstanding its advantages, ammonium polyphosphate suffers from the distinct disadvantage that it is water-soluble. Electrical insulation containing APP is generally deficient in water resistance. Leaching of APP from the composition can lead to failure of the electrical insulating properties of the composition, and reduction of fire retardancy due to the loss of potential phosphoric acid necessary for the intumescent process. Encapsulation of APP particles by various polymers has been tried in an effort to solve the problem, but this has resulted in only marginal improvement. The results have been largely unsuccessful.

It has now been found that surface modification of APP particles with vinylpyrrolidone copolymer results in markedly improved water resistance. Although it is not desired to be bound by any theory, it is believed that the surface energies of polyolefins and APP are so different they are substantially incompatible. It is believed that a goodly proportion of the APP particles will not be wetted by polyolefin under melt or near-melt processing conditions, and that these will have a tendency to form interlinked channels throughout the bulk of the composition. This will allow water attack, resulting not only in partial leaching of the APP, but also will lead to the creation of water channels through the bulk of the composition. The net results are loss of fire retardancy and loss of electrically insulative character.

Accordingly, and irrespective of any theory, one embodiment of the invention is particles of ammonium polyphosphate surface-modified with copolymer of vinylpyrrolidone and comonomer selected from the group consisting of α-olefin containing from about 4 about 50 carbon atoms, styrene, styrene substituted on the ring with at least one alkyl group containing from 1 to about 12 carbon atoms, and mixtures thereof.

The α-olefin may be straight or it may be branched. Preferably it is straight. When branched, it usually contains 1 or 2 sidechains but it may contain more when desired. The α-olefin contains from about 4 to about 50 carbon atoms. Often the α-olefin contains from about 4 to about 30 carbon atoms. Preferably the α-olefin contains from about 4 to about 20 carbon atoms. A single α-olefin or a mixture of different α-olefins may be used as desired.

When one or more alkyl substituents are attached to the ring of the styrene, each alkyl group independently contains from 1 to about 12 carbon atoms. In many cases each alkyl group contains from 1 to about 9 carbon atoms. From 1 to about 4 carbon atoms are preferred. Each alkyl group may be straight or branched, but straight alkyl is preferred. When branched, it usually contains 1 or 2 sidechains, but it may contain more when desired. The number of alkyl substituents on the ring is usually 1 or 2, but more may be present when desired. When there are two or more alkyl substituents, they may be the same or different, but usually they are the same. A single alkyl substituted styrene or a mixture of different alkyl substituted styrenes may be employed.

The relative proportions of comonomer and vinylpyrrolidone in the copolymer may be widely varied. In most cases the molar ratio of comonomer to vinylpyrrolidone is from about 0.01:1 to about 10:1. Often the molar ratio is in the range of from about 0.05:1 to about 5:1. From about 0.1:1 to about 1:1 is preferred.

Copolymers of vinylpyrrolidone and comonomer as described above are known and many of them are commercially available. In general, they are produced by addition polymerizing mixtures of vinylpyrrolidone and comonomer according to well established principles using well known techniques. The Ganex® V 516, Ganex® V 216, Ganex® V220, and Polectron® vinylpyrrolidone copolymers (GAF Corp.) are preferred.

The surface-modified APP particles of the invention may be prepared by admixing APP particles with a solution of the copolymer of vinylpyrrolidone and comonomer and then removing the solvent. Any inert solvent which will dissolve the copolymer while not dissolving significant amounts of the APP can be used. Examples of suitable inert solvents include chlorinated aliphatic hydrocarbons such as methylene chloride, chloroform, and the like, aromatic hydrocarbons such as toluene, xylene, and the like, and/or chlorinated aromatic hydrocarbons such as chlorobenzene, and the like. In most cases the treated APP particles are separated from the bulk of the copolymer solution by decantation, filtration, or centrifugation, and the residual solvent is then removed by evaporation (i.e., drying) at ambient or elevated temperatures.

The amount of the copolymer of vinylpyrrolidone and comonomer remaining on the APP particles after treatment can vary widely. Ordinarily the copolymer constitutes from about 0.1 to about 20 weight percent of the surface-modified APP particles. Often the copolymer constitutes from about 1 to about 12 weight percent of the surface-modified APP particles. From about 2 to about 5 percent by weight is preferred.

Another embodiment of the invention is a composition comprising organic polymer and particles of ammonium polyphosphate surface-modified with copolymer of vinylpyrrolidone and comonomer selected from the group consisting of α-olefin containing from about 4 to about 50 carbon atoms, styrene, styrene substituted on the ring with at least one alkyl group containing from 1 to about 15 carbon atoms, and mixtures thereof, which surface-modified APP particles have been earlier described.

The organic polymer is usually flammable but in some cases it may be nonflammable. Ordinarily the organic polymer is thermoplastic. The organic polymer may be a homopolymer, a copolymer, a terpolymer, an interpolymer, a graft polymer, or a mixture of polymers. Examples of polymers which may be used include polyolefins, polystyrene, polyesters, polyamides, polyurethanes, and polycarbonates. The preferred organic polymers are the polyolefins, including polyethylene (high density, low density or mixtures), polypropylene (atactic, isotactic, syndiotactic, stereoblock, or mixtures), copolymers of ethylene and propylene, and mixtures thereof.

The amounts of surface-modified APP which are present in compositions of the invention are subject to wide variation. Ordinarily the weight ratio of the surface-modified APP particles to the organic polymer is in the range of from about 0.01:1 to about 1:1. Often the weight ratio is in the range of from about 0.05:1 to about 0.75:1. A weight ratio in the range of from about 0.1:1 to about 0.5:1 is preferred.

In most cases the composition also comprises carbonific, spumific, or a mixture thereof. The amounts of the carbonific, spumific, or mixture thereof which may be present in compositions of the invention are subject to wide variation. When used, the weight ratio of the carbonific, spumific, or mixture thereof to the surface-modified APP particles is ordinarily in the range of from about 0.01:1 to about 2:1. Often the weight ratio is in the range of from about 0.05:1 to about 1.25:1. A weight ratio in the range of from about 0.25:1 to about 1:1 is preferred.

One or more other materials which increase fire retardancy may optionally also be present in the composition. Examples of such materials include organic fire retardant compound. In most, but not all cases, the organic fire retardant compound is halogen-containing organic fire retardant compound. Of these, the chlorine-containing and bromine-containing organic fire retardant compounds are preferred. Examples of organic fire retardant compounds which may be used in most cases include octabromodiphenyl oxide, decabromodiphenyl oxide, 1,2-bis(tribromophenoxy)ethane, N-methylhexabromodiphenylamine, poly[2,2-bis(bromomethyl)-trimethylene carbonate], and any of the usual halogen-containing organic fire retardants.

One or more other materials which will increase fire retardancy may optionally be present in the composition. Examples of such materials include zinc oxide, antimony oxide, and ferric oxide.

The compositions of the invention may optionally contain plasticizers, pigments, dyes, tints, antioxidants, visible light stabilizers, ultraviolet light stabilizers, and the like.

The listing of optional ingredients discussed above is by no means exhaustive. These and other ingredients may be employed in their customary amounts for their customary purposes so long as they are not antagonistic to good polymer formulating practice.

The compositions of the present invention have fire retardant characteristics and find many uses. They may be extruded into fibers, films, or other shapes, or molded, shaped, or formed into substantially any form. The preferred use, however, is as electrical insulation for wires and cables.

The invention is further described in conjunction with the following examples which are to be considered illustrative rather than limiting, and in which all parts are parts by weight and all percentages are percentages by weight unless otherwise specified.

EXAMPLES

Surface Modification of APP Particles

The following procedure was used to treat the APP particles. A one percent solution of copolymer of vinylpyrrolidone and α-olefin was prepared by adding 0.35 gram of the copolymer to 35 grams of methylene chloride. This solution was covered and stirred with a magnetic stirrer for 10 minutes. Next, 10 grams of APP particles was added to the copolymer solution and the mixture was stirred for 15 minutes. Stirring was then terminated and the APP particles were allowed to settle. The excess copolymer solution was pipetted off and discarded. The treated APP particles were then air-dried overnight in a hood to evaporate off the residual solvent. The dried powder was then ground to break up agglomerates and to obtain a freeflowing powder. This powder was stored in sealed test tubes.

Dispersion of Surface-Modified APP in Polyethylene

Thirty-five grams of Petrothene NA 117 polyethylene (US Industrial Chemicals) was added to the mixing chamber of a Brabender Plasti-corder torque rheometer at approximately 135° C. until the polyethylene was completely melted. Next, 5.25 grams of surface-modified APP was carefully added into the mixing chamber to provide a loading level of 15 parts of surface-modified APP per hundred parts of polyethylene resin, by weight (phr). The materials were mixed together for 5 minutes at approximately 100 revolutions per minute. The molten mixture was then placed between polytetrafluoroethylene coated plates and pressed in a laboratory press at 350° C. for several minutes until the mixture was pressed out flat. After cooling, the film was cut into three sections. These were stacked and placed between the polytetrafluoroethylene plates with 1.6 millimeter struts, and pressed once again in the laboratory press. This cutting, stacking, and pressing process was repeated until the films had a homogeneous appearance without visible air bubbles (if possible) in the film. In this manner 1.6 millimeter thick plaques were obtained for water immersion studies.

Determination of APP Leaching

Test specimens measuring either 5.08 centimeters×2.54 centimeters or 6.99 centimeters×3.81 centimeters were cut from the plaques. Samples were immersed in 237 milliliter wide mouth borosilicate jars filled with distilled-deionized water. The jars were sealed and placed in an 80° C. oven for 14 days. The samples were analyzed for phosphorus content by X-ray fluorescence (XRF) and by elemental analysis (EA). The result of an X-ray fluorescence analysis is an indication of the phosphorus content of a thin surface region of the sample. The result of an elemental analysis is an indication of the average phosphorus content throughout the bulk of the sample. The identities of the copolymers employed are shown in Table 1 and the results are shown in Table 2. "MW" is an abbreviation for approximate molecular weight unless otherwise specified.

TABLE 1

| Copolymers | |
|---|---|
| Abbreviation | Identity |
| V-516 | Ganex ® V 516 copolymer of vinylpyrrolidone and α-hexadecene |
| V-216 | Ganex ® V 216 copolymer of vinylpyrrolidone and α-hexadecene; MW = 7300 |

TABLE 2

| | Results of Analyses for Phosphorus | | | | | |
|---|---|---|---|---|---|---|
| | Surface P by XRF, wt % Immersion Time | | Surface P Leached, % | Bulk P by EA, wt % Immersion Time | | Bulk P Leached, % |
| | 0 days | 14 days | | 0 days | 14 days | |
| Controls | | | | | | |
| Polyethylene Blank | 0 | 0 | — | — | — | — |
| APP, untreated | 4.7 | 1.6 | 66.0 | 4.60 | 3.88 | 15.6 |
| | 3.9 | 1.0 | 74.4 | — | — | — |
| Copolymer | | | | | | |
| V-516 | 2.4 | 0.8 | 66.7 | — | — | — |
| V-216 | 2.4 | 1.3 | 45.8 | 4.04 | 4.09 | — |
| Comparative Example | | | | | | |
| APP encapsulated by low density polyethylene | 4.5 | 1.4 | 68.9 | 4.27 | 3.61 | 15.5 |

A comparison of the Bulk P by Elemental Analysis for the polymer encapsulated APP and the untreated APP shows that encapsulation with low density polyethylene is not very effective in reducing the water leaching of APP. Similar comparisons of APP surface-modified with the copolymers of vinylpyrrolidone and α-olefin shows that the surface-modifications provided by the copolymers were effective in reducing the water leaching of APP.

The data also show that APP surface-modified with the copolymers of vinylpyrrolidone and α-olefin tended to concentrate away from the surface of the samples. The reason for this is not known, but the effect is a distinct advantage since less APP is exposed at the surface for water extraction.

Although the present invention has been described with reference to specific details of certain embodiments thereof, it is not intended that such details should be regarded as limitations upon the scope of the invention except insofar as they are included in the accompanying claims.

We claim:

1. Particles of ammonium polyphosphate surface-modified with copolymer of vinylpyrrolidone and comonomer selected from the group consisting of α-olefin containing from about 4 to about 50 carbon atoms, styrene, styrene substituted on the ring with at least one alkyl group containing from 1 to about 12 carbon atoms, and mixtures thereof.

2. The particles of claim 1 wherein said comonomer is α-olefin.

3. The particles of claim 2 wherein said α-olefin contains from about 4 to about 20 carbon atoms.

4. The particles of claim 2 wherein said α-olefin is straight.

5. The particles of claim 2 wherein said α-olefin is α-hexadecene.

6. The particles of claim 1 wherein said comonomer is styrene.

7. The particles of claim 1 wherein the molar ratio of said comonomer to vinylpyrrolidone in said copolymer is from about 0.01:1 to about 10:1.

8. The particles of claim 1 wherein said copolymer constitutes from about 0.1 to about 20 weight percent of said particles.

9. A composition comprising organic polymer and particles of ammonium polyphosphate surface-modified with copolymer of vinylpyrrolidone and comonomer selected from the group consisting of α-olefin containing from about 4 to about 50 carbon atoms, styrene, styrene substituted on the ring with at least one alkyl group containing from 1 to about 12 carbon atoms, and mixtures thereof.

10. The composition of claim 9 wherein said comonomer is α-olefin.

11. The composition of claim 10 wherein said α-olefin contains from about 4 to about 20 carbon atoms.

12. The composition of claim 10 wherein said α-olefin is straight.

13. The composition of claim 10 wherein said α-olefin is α-hexadecene.

14. The composition of claim 9 wherein said comonomer is styrene.

15. The composition of claim 9 wherein said copolymer constitutes from about 0.1 to about 20 weight percent of said particles.

16. The composition of claim 9 wherein the molar ratio of said comonomer to vinylpyrrolidone in said copolymer is from about 0.01:1 to about 10:1.

17. The composition of claim 9 wherein said organic polymer is polyolefin.

18. The composition of claim 9 wherein said polymer is polyethylene.

19. The composition of claim 9 wherein the weight ratio of said surface-modified particles to said polymer is in the range of from about 1:100 to about 100:100.

20. The composition of claim 9 which comprises carbonific, spumific, or a mixture thereof.

21. The composition of claim 20 wherein the weight ratio of said carbonific, spumific, or mixture thereof to said particles is in the range of from about 1:100 to about 200:100.

22. The composition of claim 9 which comprises carbonific.

23. The composition of claim 22 wherein said carbonific is pentaerythritol.

24. The particles of claim 5 wherein said copolymer constitutes from about 0.1 to about 20 weight percent of said particles.

25. The particles of claim 24 wherein the molar ratio of said $\alpha$-hexadecene to vinylpyrrolidone in said copolymer is from about 0.01 to about 10:1.

26. The composition of claim 18 wherein said $\alpha$-olefin is $\alpha$-hexadecene.

27. The composition of claim 26 wherein
(a) said copolymer constitutes from about 0.1 to about 20 weight percent of said particles,
(b) the molar ratio of said $\alpha$-hexadecene to vinylpyrrolidone in said copolymer is from about 0.01 to about 10:1, and
(c) the weight ratio of said surface-modified particles to said polyethylene is in the range of from about 1:100 to about 100:100.

28. The composition of claim 27 which comprises pentaerythritol.

* * * * *